US009789764B2

(12) United States Patent
Bissontz

(10) Patent No.: US 9,789,764 B2
(45) Date of Patent: Oct. 17, 2017

(54) VEHICLE ELECTRICAL SYSTEM STATE CONTROLLER

(75) Inventor: Jay E. Bissontz, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 492 days.

(21) Appl. No.: 14/369,875

(22) PCT Filed: Mar. 7, 2012

(86) PCT No.: PCT/US2012/027947
§ 371 (c)(1),
(2), (4) Date: Jun. 30, 2014

(87) PCT Pub. No.: WO2013/133813
PCT Pub. Date: Sep. 12, 2013

(65) Prior Publication Data
US 2015/0217640 A1    Aug. 6, 2015

(51) Int. Cl.
B60L 15/20          (2006.01)
B60L 1/00           (2006.01)
(Continued)

(52) U.S. Cl.
CPC ............... *B60L 1/00* (2013.01); *B60L 1/003* (2013.01); *B60L 1/06* (2013.01); *B60L 3/0069* (2013.01); *B60L 3/0084* (2013.01); *B60L 3/04* (2013.01); *B60L 3/102* (2013.01); *B60L 3/108* (2013.01); *B60L 3/12* (2013.01); *B60L 7/14* (2013.01);
(Continued)

(58) Field of Classification Search
CPC ..................................... B60L 3/12; B60L 3/04
See application file for complete search history.

(56) References Cited

U.S. PATENT DOCUMENTS 5,596,180 A * 1/1997 Hofmann ............... H01H 9/02
                                                    200/11 C
6,158,541 A * 12/2000 Tabata ................... B60K 6/28
                                                    180/165
(Continued)

FOREIGN PATENT DOCUMENTS

WO        2013/133813        9/2013

OTHER PUBLICATIONS

Search report from corresponding parent application PCT/US2012/027947.

Primary Examiner — Thienvu Tran
Assistant Examiner — Pinping Sun
(74) Attorney, Agent, or Firm — Jeffrey P. Calfa; Mark C. Bach

(57) ABSTRACT

A motor vehicle electrical power distribution system includes a plurality of distribution sub-systems, an electrical power storage sub-system and a plurality of switching devices for selective connection of elements of and loads on the power distribution system to the electrical power storage sub-system. A state transition initiator provides inputs to control system operation of switching devices to change the states of the power distribution system. The state transition initiator has a plurality of positions selection of which can initiate a state transition. The state transition initiator can emulate a four position rotary ignition switch. Fail safe power cutoff switches provide high voltage switching device protection.

7 Claims, 6 Drawing Sheets

(51) Int. Cl.
*B60L 11/18* (2006.01)
*B60L 15/38* (2006.01)
*B60R 16/03* (2006.01)
*B60L 3/04* (2006.01)
*B60L 3/00* (2006.01)
*B60L 1/06* (2006.01)
*B60L 3/10* (2006.01)
*B60L 3/12* (2006.01)
*B60L 7/14* (2006.01)
*B60L 11/14* (2006.01)

(52) U.S. Cl.
CPC ........... *B60L 11/14* (2013.01); *B60L 11/1861* (2013.01); *B60L 11/1868* (2013.01); *B60L 15/20* (2013.01); *B60L 15/2009* (2013.01); *B60L 15/38* (2013.01); *B60R 16/03* (2013.01); *B60L 2200/36* (2013.01); *B60L 2210/10* (2013.01); *B60L 2210/40* (2013.01); *B60L 2220/14* (2013.01); *B60L 2240/12* (2013.01); *B60L 2240/34* (2013.01); *B60L 2240/545* (2013.01); *B60L 2240/547* (2013.01); *B60L 2240/549* (2013.01); *B60L 2240/662* (2013.01); *B60L 2240/80* (2013.01); *B60L 2250/16* (2013.01); *B60L 2260/26* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01); *Y02T 10/7241* (2013.01); *Y02T 10/7275* (2013.01); *Y02T 10/7291* (2013.01); *Y02T 90/16* (2013.01)

(56) References Cited

U.S. PATENT DOCUMENTS

| | | | |
|---|---|---|---|
| 8,051,740 B2 * | 11/2011 | Giefer | B60K 37/06 74/473.21 |
| 2006/0100758 A1 * | 5/2006 | Katrak | B60R 16/005 701/36 |
| 2009/0248228 A1 * | 10/2009 | Miller | B60K 6/485 701/22 |

* cited by examiner

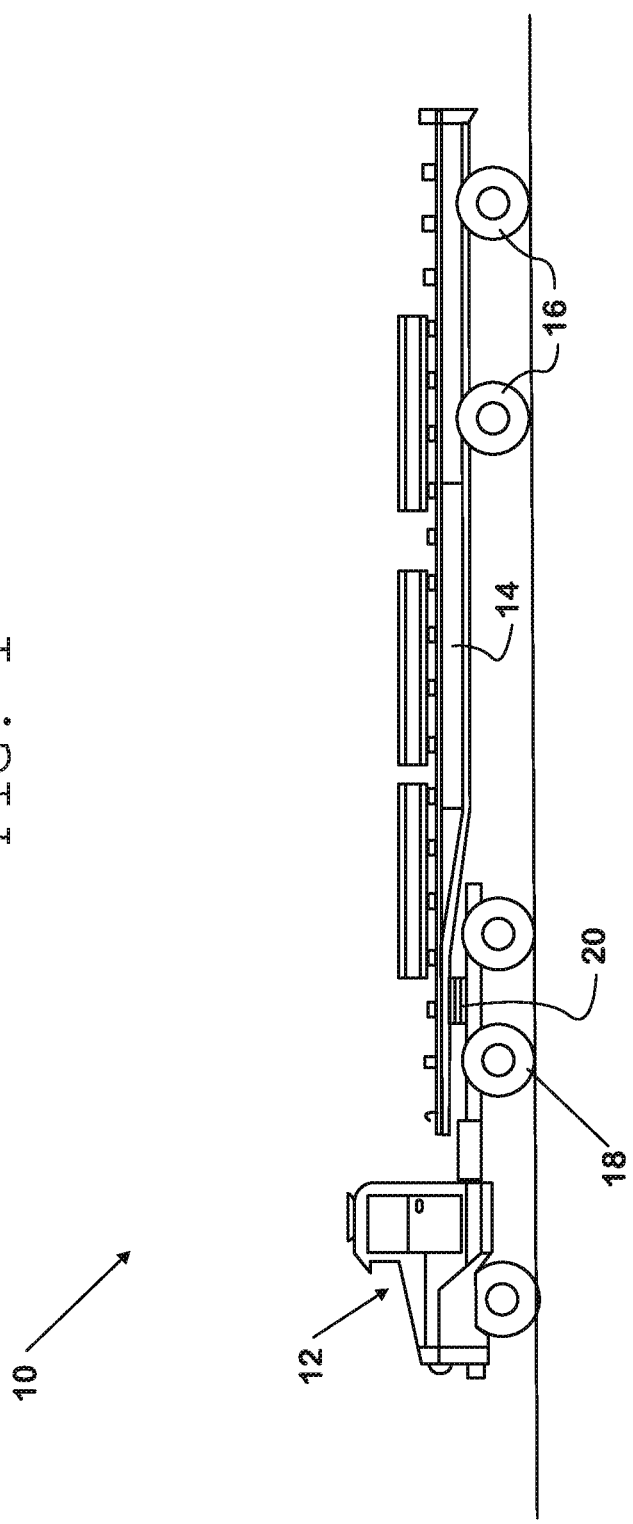

ical System State Controller -->

VEHICLE ELECTRICAL SYSTEM STATE CONTROLLER

U.S. GOVERNMENT RIGHTS

This concept was made with United States government support under Award No. DE-EE0003303 awarded by the U.S. Department of Energy. The United States government has certain rights in this concept.

BACKGROUND

Technical Field

The technical field relates generally to state control of electrical systems on motor vehicles, and more particularly to state control over power distribution systems for hybrid vehicles equipped with electric traction motors and internal combustion engines.

Description of the Technical Field

A familiar feature of motor vehicles equipped with internal combustion engines has been the rotary, four position ignition switch. The usual positions and arrangement provided by these ignition switches include, advancing in a clockwise direction, an ACCESSORY position, an OFF position, an ON position and a START position. Prior to the introduction of computer systems for control of motor vehicles, ignition switches were electro-mechanical devices where each position corresponded directly to a particular state of the electrical system on the vehicle, provided the vehicle battery was not dead. With the switch in the "accessory" position vehicle systems such as the engine ignition system (on spark ignition engines) were cut off from power but a limited set of electrical components, such as a radio, were allowed to draw power from the vehicle battery. The off position of the ignition switch was the most restrictive state with only a very few components, such as a vehicle clock, which had a direct connection to the vehicle battery able to receive power. In the run or ON position of the rotary ignition switch the engine was usually running, but whether running or not virtually all electrical systems were allowed to draw power excluding the cranking motor. In the start position the starter motor and any electronics used to crank and start an internal combustion engine were operative while other electrical components were temporarily disabled to increase available power.

Motor vehicles have seen the increasing use of computer control over vehicle operation. Hybrid-electric vehicles are increasingly common, particularly for commuter vehicles and urban delivery applications. Notwithstanding these developments many familiar control elements are often retained, such as a control element emulating the four position ignition switch. Emulation of familiar control elements provides an intuitive feel to vehicles and can simplify a driver's transition to such vehicles. Body computers (and analogous systems), on board networks and hybrid-electric vehicles have made the relationship between ignition switch position and the vehicle electrical system state an indirect one. The indirectness of the relationship stems in part from the fact that the "ignition switch" control element no longer provides a direct mechanical link to a power circuit breaker for most vehicle systems. The contemporary ignition switch operates as a data input source for the vehicle body computer which in turns controls relay and switch states. In addition, hybrid-electric vehicles are more likely to have distinct power distribution sub-systems operating at different voltages. As a result there are a greater number of potential electrical system states than the four found on most 20$^{th}$ century internal combustion engine vehicles.

The possibility of a large number of electrical states is common to hybrid-electric vehicles, which can have different power distribution sub-systems operating at different nominal voltage levels and may include direct current (DC) or alternating current (AC) sub-systems. The differentiation between power distribution sub-systems and the increasing number of electrified accessories, such as electrical motors for power steering, increases the number of possible energization states that the overall power distribution system can assume. The presence of multiple voltage levels on the vehicle and the high current levels possible on some of these system compared to prior 12-volt DC electrical systems can complicate transitions between states of the electrical system.

A traditional rotary ignition switch provided a hardwired, manually operated switch for isolating much of the electrical distribution system of a vehicle from the vehicle's battery. Contemporary electronic controls use an "ignition switch" as a data source. Because of this it is not a manual fail safe to isolate the power distribution system from electrical power source. Because of this electric and hybrid-electric vehicles are usually configured with one or more hardwired switches independent of the computerized control system which can be used in an emergency for isolating the vehicle's electrical prime movers or accessory sub-systems from the source of electrical power and for preventing these sub-systems from reinitializing. These switches may be automatic, manual or both, but in any event they operate independently of the electronic control system to allow a forced shut down of the high voltage sub-systems on a vehicle. In hybrid-electric vehicles such forced shutdowns can produce abrupt power interruptions which can result in damage to the high voltage contactors and other components, particularly when substantial amounts of current are flowing through the contactors, because power interruption can take place outside of a normal computer implemented power shut down protocol and occur without prior load shedding.

SUMMARY

A motor vehicle includes a multi-division power distribution system, an electrical power storage system and a plurality of switching devices for selective connection of divisions of the power distribution system to the electrical power storage system and loads to the power distribution system to establish a power distribution system state. A control system provides plurality of controllers which communicate over a data link. The plurality of controllers operate the plurality of switching devices to select a state from among a plurality of predefined states of the multi-division power distribution system. An operator actuated state transition initiator allows for operator input in selection of one of the predefined states of the power distribution system. Among the controllers is a vehicle body computer/electrical system controller which is programmed to relate input selections from an operator actuated state transition initiator to the plurality of power distribution system states and to transitions between those states.

The number of the plurality of predefined states of the multi-division power distribution system can exceed in number the plurality of positions of the operator actuated state transition initiator, particularly where the operator state transition initiator emulates a rotary type vehicle ignition switch with four positions. Where configured like a rotary ignition switch the operator actuated state transition initiator functions in a manner substantially transparent to the operator of the vehicle. The control system further provides for interaction of the system with fail safe power cutoff switches and provides high voltage switching device protection during instances of control system low voltage conditions.

BRIEF DESCRIPTION OF THE DRAWINGS

FIG. 1 is a side elevation of a truck and trailer system which may be equipped with a hybrid electric drive train.

DETAILED DESCRIPTION

Figure 2A:
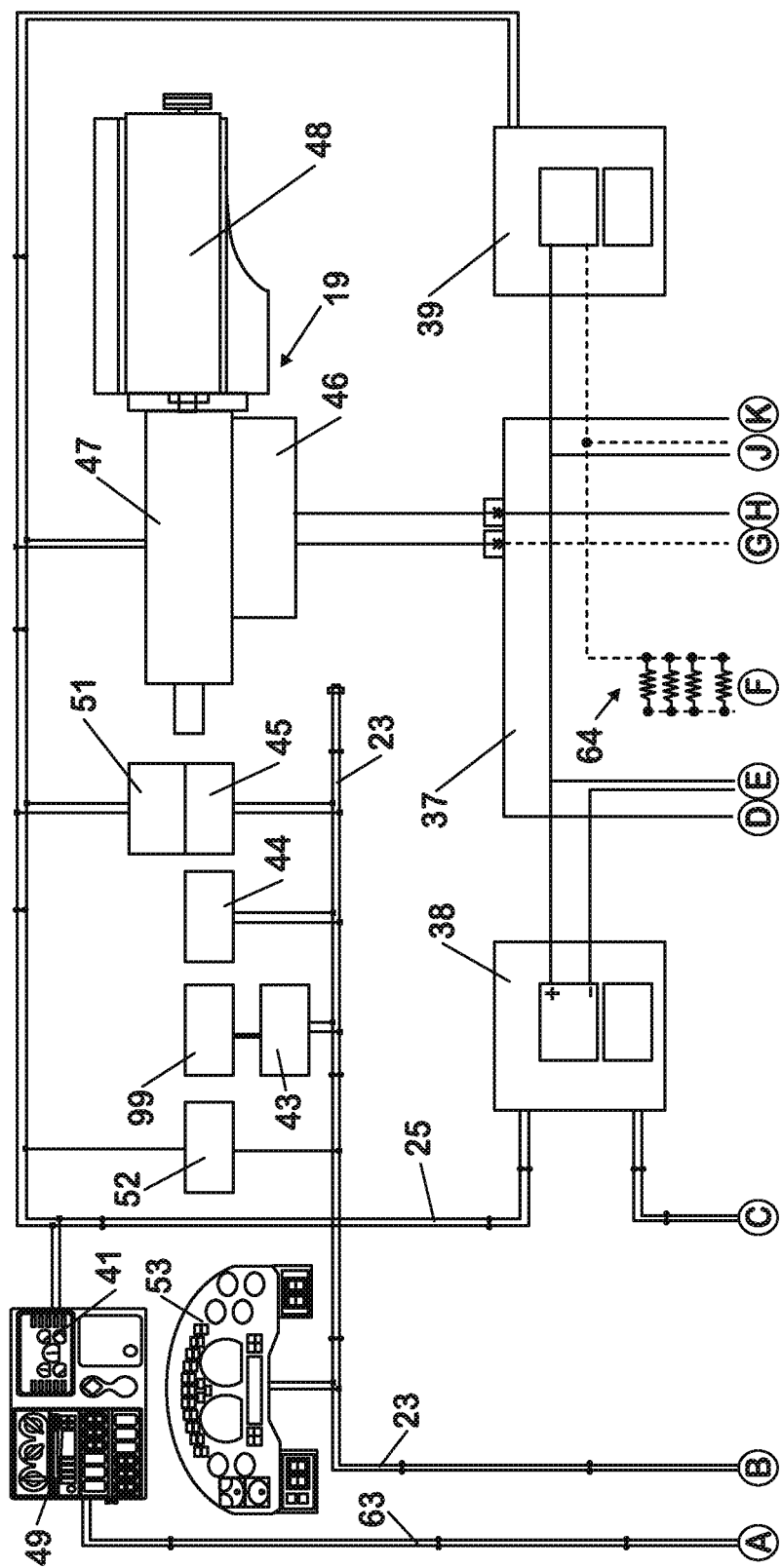
FIGS. 2A and 2B comprise a high level block diagram of a control and power distribution system for the truck of FIG. 1.

In the following detailed description, like reference numerals and characters may be used to designate identical, corresponding, or similar components in differing drawing figures. Furthermore, example sizes/models/values/ranges may be given with respect to specific embodiments but are not to be considered generally limiting.

Referring now to the figures and in particular to FIG. 1, a truck/trailer combination 10 comprising a truck 12 with a trailer 14 attached thereto along the axis of a fifth wheel 20 is shown. Trailer 14 rides on a plurality of wheels 16. Truck 12 rides a combination of wheels 16 and drive wheels 18. Drive wheels 18 are connected to a hybrid electric drive train 19 for locomotion. The rotation of wheels 16 and drive wheels 18 can be retarded to stop the vehicle through service brake system which is actuated using a pneumatic system. The rotation of drive wheels 18 can also be retarded by using them to back drive the hybrid electric drive train 19 to generate electricity. Truck 12 or trailer 14 may be equipped with a power take-off (PTO) application 54 (See FIGS. 2A and 2B).

Figure 2B:
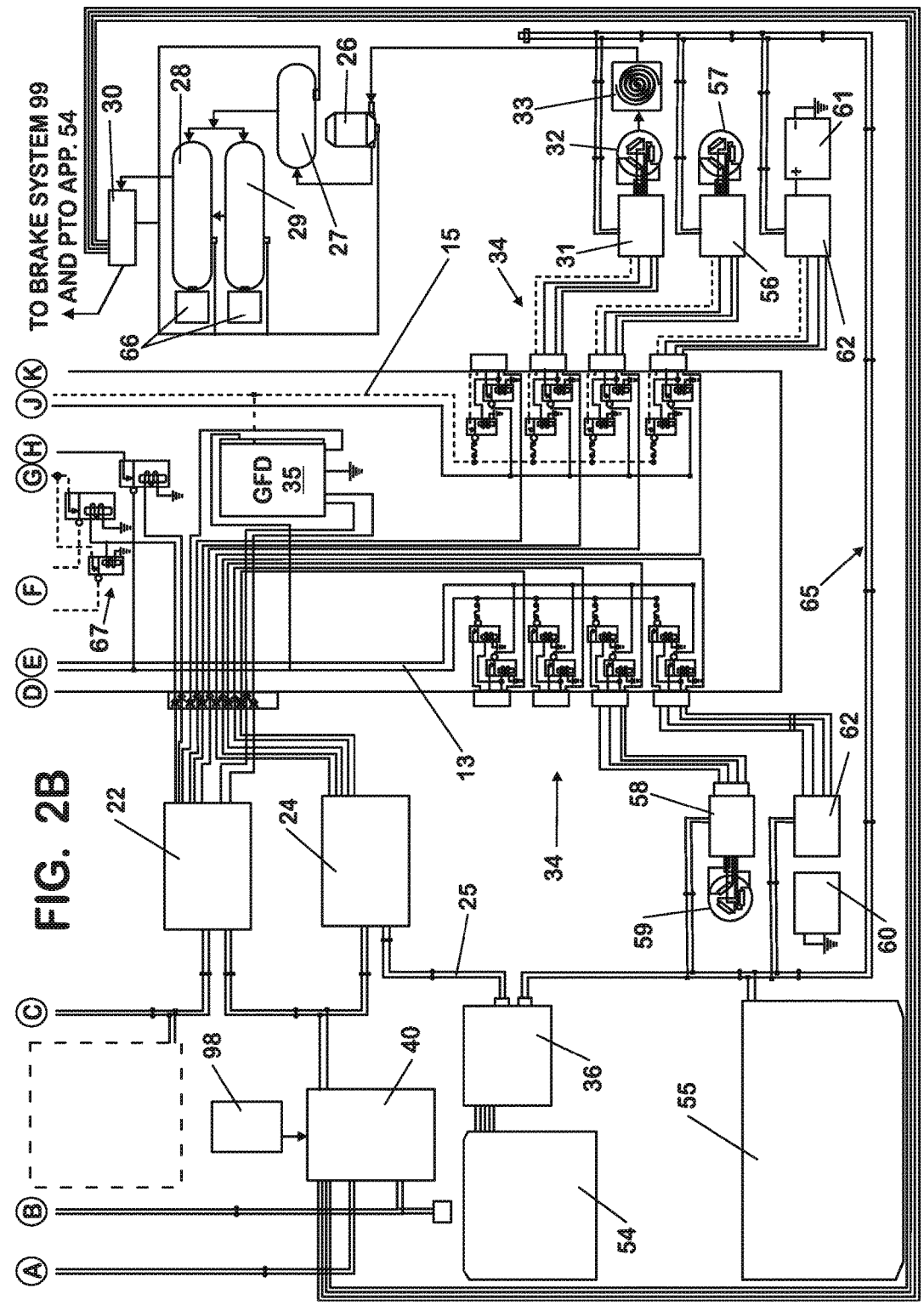

FIGS. 2A and 2B comprise a high level schematic of an electrical power distribution system including a high voltage distribution box 37 and a control system for a hybrid-electric vehicle. The electrical power distribution system is a multi-division system in that it operates at a plurality of direct current (DC) voltage levels. These include 350 volt accessory bus 13, accessory bus 15, 700 volt direct current feed 17 and low voltage sub-system 65. It can also provide three phase high voltage alternating current from high voltage inverter/converter 46. Control is exercised by an electronic system controller (ESC) 40, controller area network data links 23, 25, local controllers and slave elements identified as remote power modules (RPM) 22, 24 and 36. Taken together these elements implement a control system for energization and de-energization of elements of the electrical power distribution system and the loads connected thereto. The electrical power distribution system has a plurality of states related to which portions of the system are active or "hot" and which components can draw power. The power distribution system is a multi-division system which can be used with hybrid electric drive train 19 and to supply power to high voltage DC to motors and to DC/DC converters 62A-B for accessory/auxiliary low voltage electrical systems as a single and multi-phase alternating current to other vehicle systems such as a dual mode electrical machine 47 which can function as a traction motor or as a generator.

Power flow over the electrical power distribution system is routed using a high voltage distribution box 37 to which are attached two high voltage battery sub-packs 38 and 39, a high voltage inverter/converter 46, a plurality of motor controllers 31, 56 and 58 for DC electric accessory motors 32, 57 and 59, and a pair of bi-directional DC/DC converters 62A-B. DC/DC converters 62A-B support power distribution over a (12 volt) DC low voltage sub-system 65 which includes 12 volt chassis batteries 60, 61.

Hybrid electric drive train 19 is represented as a parallel system, though the present disclosure is not limited to such systems and could be applied to series hybrids and to non-hybrid vehicles, particularly if equipped with differentiated electrical power distribution systems. The hybrid electric drive train 19 includes a thermal/internal combustion engine 48 and a dual mode electrical machine 47. Electrical machine 47 may be run in an electric traction motor mode or it may be back driven from drive wheels 18 (or thermal engine 48) for operation in an electrical generator mode. Electrical machine 47 is a three phase alternating current (AC) synchronous machine. Connection between a 700 volt direct current feed 17 and the electrical machine 47 is through a high voltage inverter/converter 46 which operates at 700 volts DC from a 700 volt direct current feed 17 side and at a high voltage, variable frequency, three phase alternating current on the electrical machine 47 side. High voltage distribution box 37 includes a ground fault detector (GFD) 35 which provides for detecting voltage leakage from the direct current feed 17 or one of the accessory bus 13 or accessory bus 15 to the vehicle ground reference.

The traction battery is implemented by a pair of high voltage battery sub-packs 38, 39. The high voltage battery sub-packs receive power generated by the dual mode electrical machine 47 in its generator mode, supply power to the electrical machine 47 in its traction motor mode and stabilize high voltage power distribution system voltage. Each battery sub-pack 38, 39 supports a 350 volt DC potential difference and the battery sub-packs may be connected in series using high voltage switching devices 67 (implemented here with isolation contactors) to direct current feed 17 to the high voltage inverter/converter 46 to supply 700 volts DC to the inverter/converter 46. High voltage battery sub-pack 38 is connected to accessory bus 13 to supply power on the bus at 350 volts (the difference between the positive terminal of the sub-pack and reference ground). Accessory bus 15 is connected across the positive terminal of high voltage battery sub-pack 38, which is connected to the negative terminal of high voltage battery sub-pack 39, and the positive terminal of high voltage battery sub-pack 39. Use of a split battery plant, that is two high voltage battery sub-packs 38, 39, allows distribution of direct current (DC) power through the high voltage distribution box 37 to accessory motors at 350 volts DC on accessory buses 13, 15.

High voltage battery sub-packs 38 and 39 include battery management system (BMS) controllers 70 which report over hybrid CAN data link 25 on traction battery voltage and current flow into and out of the sub-packs. Additional data may be reported such as battery temperature. The BMS controllers 70 can also calculate an estimated battery state of charge (SOC) which relates to the ability of the high voltage battery sub-packs 38, 39 to accept current inflows (charging) and support current outflows (discharging). These rates may also vary with battery temperature and other variables. If loads or sources on the system exceed a maximum acceptable rate, for example by driving excess current into the high voltage battery sub-packs 38, 39 stemming from an over voltage condition, damage to the high voltage battery sub-packs 38, 39 may result. Battery SOC drives starting and stopping of the thermal engine 48 from any of several states of the control and power distribution system.

Electrical power to drive the dual mode electrical machine 47 as a traction motor is delivered to the dual mode electrical machine through the high voltage inverter/converter 46 from a high voltage distribution box 37 across traction bus 11. Power is supplied to the high voltage distribution box 37 from high voltage battery sub-packs 38, 39. Power generated by the dual mode electrical machine 47 when in its generator mode passes through the high voltage inverter/converter 46 back to high voltage battery sub-packs 38, 39 for storage as chemical energy. This can occur as a result of regenerative/dynamic braking or due to the electrical machine being back driven by the thermal engine 48 up to the rate of charge limits and total charge capacity of the high voltage battery sub-packs 38, 39. The rates at which battery sub-packs 38, 39 can accept or deliver current are functions of battery temperature and battery SOC.

Isolation contactors 67 and accessory isolation contactors 34 provide for power routing to the hybrid electric drive train 19 and the accessories. Associated with isolation contactors 67 are a plurality of pre-charge resistors 64 for limiting current inflow during system initialization. The operation of the pre-charge resistors 64 is conventional with the pre-charge resistors being switched out of the circuit by reconfiguring the isolation contactors 67 after the initialization period. Located within the high voltage distribution box 37 is the GFD 35. GFD 35 is connected to insert signals on the direct current feed 17 or onto the accessory buses 13, 15 and from there into the high voltage inverter/converter 46, the accessory motors 32, 57, 59 and to the DC/DC converters 62A-B. A RPM 22, which functions as an extension of a electronic system controller (ESC) 40, a type of body computer, controls the states of sets of isolation contactors 67 and accessory isolation contactors 34 as directed by the ESC 40. Accessory isolation contactors 34 provide power couplings to motor controllers 31, 56 and 58 and thereby to accessory motors 32, 57 and 59 and to bi-directional DC/DC converters 62A-B through which power is transmitted to, and drawn from, first and second twelve-volt chassis batteries 60, 61.

The vehicle may or may not include power take-off operation (PTO) applications such as pneumatic PTO application 54. While PTO application 54 is shown as pneumatic powered from a vehicle compressed air system a PTO application can take a number of forms, such as a 60 cycle 110 volt electrical system energized from a high voltage power bus or a hydraulic system operated off a vehicle transmission. PTO applications may be intended for use when the vehicle is in motion or they may operate when the vehicle is stationary. These factors in turn may be used by a system programmer to define distinct electrical power distribution system states for particular PTO applications. Where a familiar four position "rotary ignition type" switch or (operator actuated) state transition initiator 98 is provided in the vehicle cab the "accessory" or "02" position may be reserved for establishing a particular state if it is intended that the vehicle be stationary when the PTO application is invoked.

Four position switch/operator actuated state transition initiator 98 functions as a electrical power system state transition initiator. In some applications state transition initiator 98 may approach being a state selection device, however the end state will usually be determined by positioning of the switch and a prior state. Other applications may proved that operation of the state transition initiator 98 and another event occur before a state transition occurs.

Vehicle control is implemented through a plurality of data links and controllers. There are two data buses which provide the back bones for a drive train controller area network (CAN) data link 23 and a hybrid controller area network (CAN) data link 25, respectively. Data links 23, 25 and the controllers connected thereto conform to the Society of Automotive Engineers J1939 standard and implement a communications protocol conforming to the same standard. There is a lower capacity J1708 data bus 63 conforming to the SAE J1708 protocol used to convey switch state information from a dash panel 49 to ESC 40. A driver display 41 relating to hybrid system condition is connected to hybrid data link 25 over which it receives data relating to power distribution system operation for display to an operator.

A plurality of programmable controllers are interconnected by data links 23, 25 or both. The controllers generally relate to major vehicle systems as identified by their names, for example, the anti-lock brake system (ABS) controller 43. ABS controller 43 measures the rotational speed of wheels 16 and drive wheels 18 and provides data allowing involved in control over the truck/trailer combination 10 service brake system 99 and control over individual brakes. The service brake system 99 is a conventional pneumatic system for a truck allowing extension of the system to trailer 14. The pneumatic system operates as a vehicle accessory system driven by compressor accessory motor 32 and pneumatic compressor 33 and, by way of example, is shown connected to support a pneumatic PTO application 54 under the control of remote power module (RPM) 36 which interacts with compressor motor controller 31 during PTO application 54 operation. Compressor accessory motor 32 draws electrical power from the traction batteries or the dual mode electrical machine 47. The pneumatic system includes a pneumatic compressor 33 which supplies compressed air to compressed air supply tanks 27, 28 and 29 and an air dryer 26 which in turn supply vocations such as brakes or pneumatic PTO application 54. A manifold solenoid valve controller (MSVA) 30 allows use of compressed air from the supply tanks 28, 29 to operate purge valves for the air dryer 26, to supply air to the service brake system 99 or to the pneumatic PTO application 54. Pressure sensors 66 for the supply tanks 28, 29 communicate air pressure readings to a supervisory controller (for example ESC 40 or hybrid control unit (HCU) 51) for the compressor motor controller 31 and MSVA 30. The demand level for compressed air will be seen to be proportional to current drawn by compressor accessory motor 32 to maintain pneumatic system pressure. Compressed air consumption may, due to the PTO application 54, be limited to periods when truck 12 is immobilized through use of control system interlocks.

Other controllers include a transmission control unit (TCU) 42, an engine valve controller 44, an engine control unit (ECU) 45, battery management system (BMS) controllers 70 associated with high voltage battery sub-packs 38 and 39 and HCU 51. In addition, ESC 40 provides integration functions and handles control over the states of the accessory isolation contactors 34 and isolation contactors 67 of the high voltage distribution box 37 through programmable RPMs 24 and 22. ESC 40 controls secondary cooling loop 55. In addition ESC 40 provides supervisory control over MSVA 30 and is connected to receive position inputs of 0, 1, 2 and 3 from a four position state transition initiator 98. State transition initiator 98 may operate physically in a manner analogous to a rotary ignition switch.

The controllers connected to ESC 40 over one or both of the data links 23, 25, and sensors directly connected to ESC 40 or which can communicate to ESC 40 through another controller, provide data relating to truck 12 operating variables. These in turn relate to expected power consumption by dual mode electrical machine 47, one the accessory motors 32, 57, 59 or the DC/DC converters 62A-B. To take an example, data from either the ABS controller 43 or TCU 42 may be used to generate an estimate of vehicle speed. Vehicle speed is in turn inversely related to power consumption by the power steering accessory motor 59 provided the rate of change in the angle of the wheels used for turning is constant. Another example is demand on HVAC compressor accessory motor 57 to support cabin cooling. Power consumption by compressor accessory motor 57 is related to outside ambient temperature and the cabin temperature request made by the operator.

Gauge and display cluster controller 53 and the engine valve controller 44 are connected only to the drive train data link 23. The HCU 51 and ECU 45 communicate directly with one another and over the hybrid data link 25 and drive train data link 23, respectively, with other controllers. The BMS controllers 70 for the high voltage battery sub-packs 38, 39 are connected to the hybrid data link 25 only, as is a heating, ventilation and air conditioning (HVAC) pusher fans and controller 52. RPMs 22, 24 and 36 are controlled over the hybrid data link 25 from ESC 40. Networked interaction made possible by CAN technology gives ESC 40 access to data relating to a number of vehicle operating conditions such as vehicle speed (which relates to power steering power demands), ambient temperature (which relates to air conditioner compressor power demands), and so on.

RPMs 24 and 22 provide essentially direct ESC 40 control over accessory isolation contactors 34 and isolation contactors 67, respectively. ESC 40 controls motor controllers 58, 56 and 31 over hybrid data link 25 and thus controls the compressor accessory motor 32 which is the prime mover for pneumatic compressor 33.

Reconfigurable software installed for execution by the ESC 40 and the CAN based control architecture allows voltage levels generated by electrical machine 47 and the voltage level on and current sourced by the high voltage battery sub-packs 38, 39 to be monitored in near real time. The amount of electrical energy being discharged from one or more high voltage battery sub-packs 38, 39 to support the operation of the electrical machine is known. If either the voltage levels generated, or the current levels drawn, by electrical machine 47 exceed predetermined levels as defined in the software controls of ESC 40 the ESC 40 can request that the HCU 51 command the electrical machine 47 to modify its output voltage or current draw characteristics to acceptable levels as defined by the high voltage direct current storage devices energy performance specifications. This can involve reducing vehicle acceleration or engaging the thermal engine 48 to carry some or all of the power demanded. Operation of thermal engine 48 is usually a function of traction battery state of charge (SOC) and thus it may or may not run, and may switch between running and not running, in more than one electrical power distribution system state.

The reconfigurable software executed by ESC 40 is also reprogrammable to define the energization states of the low and high voltage electrical power distribution system to be provided. For example, contemporary long haul trucks are often equipped with on-board living quarters to accommodate driver breaks. Heating, ventilation and air-conditioning (HVAC) and 110 volt AC power (not shown) provide such quarters with amenities. In order to meet the demand for heating, ventilation or air conditioning the electrical power distribution system is placed in a state where the high voltage HVAC compressor accessory motor 57 can draw power. Because regulatory and legal regimes frequently prohibit idling of the thermal engine 48 to generate power for these demands the traction batteries will discharge. Responsive to battery SOC the thermal engine 48 is restarted for relatively brief periods of non-idle level operation to maintain a minimum traction battery state of charge. Identical considerations can apply to a pneumatic PTO application 54 operating from a stationary vehicle except that here it is the compressor accessory motor 32 which is allowed to draw power instead of the HVAC compressor accessory motor 57.

The various states which may be provided the electrical power distribution system factor into which isolation contactors 67, 34 are open and which are closed. In addition, emergency conditions can also factor into this determination. For example, if the dual mode electrical machine (traction motor/generator) 47 does not respond to the HCU 51 commands, the HCU will direct isolation contactors 67 to a state interrupting the flow of electrical power between the high voltage direct current storage devices (e.g. high voltage battery sub-packs 38, 39) and the electrical machine 47. At the same time, because of the multiple mutually isolated configuration of the hybrid electric vehicle's high voltage distribution system, the HCU 51 and ESC 40 have the option not to interrupt high voltage DC power to selected electric components of sub-systems. These components include particularly the accessory motors 32 and 59 for the pneumatic system and power steering, DC-to-DC converters 62A-B for the twelve volt DC power distribution system, secondary cooling loops 55 and to a lesser extent HVAC compressor accessory motor 57. The state machine described below relates to non-emergency conditions wherein changes in the state of the isolation contactors 67, 34 are minimized in order to extend the service lives of the isolation contactors.

The system provides passive monitoring of the state of high voltage isolation contactors 67 and accessory isolation contactors 34 by ESC 40 and HCU 51, particularly the conductive states of the contactors relative to the operation of the electrical machine 47. This occurs in conjunction with monitoring of the performance characteristics of the high voltage storage devices (battery sub-packs 38, 39). Driver display 41 is used to provide an operator with direct graphic, text and audible indications depending on the state and status of the isolation contactors 67, 34, the state of operation of the electrical machine 47 and the performance variables of the high voltage storage devices 38, 39.

Employing reconfigurable software executed by the ESC 40 and the controller area network (CAN) based electrical hardware architecture which incorporates buses/data links 23, 25, the ESC 40 is connected to the in-cab mounted key type state transition initiator 98 allowing use of the rotary ignition switch like state transition initiator 98 to serve as an input device for changing operational states of the hybrid vehicle's high and low voltage electrical power distribution systems in a manner consistent to the safe operation of the vehicle. A four position rotary switch is not the only input device that could be used to request state transitions, and such transitions may also occur due to exogenous or automatic factors, such as an emergency or accident conditions detected by the vehicle or the traction battery state of charge. Reference to state transition initiator 98 as a "rotary ignition switch like device" means that the initiator does not function exactly like an ignition switch on truck 12 where the switch is installed on a hybrid vehicle.

The state transition initiator 98 is monitored by an intelligent CAN capable device such as the ESC 40 which in turn broadcasts the numerical value of the position of state transition initiator 98 over data links 23, 25 to the other intelligent controllers 31, 56, 58, 62A-B and RPMs 22, 24 and 36 which are involved in the control of the hybrid electric vehicle systems and subsystems. In order to implement computer control, ignition switch positions now provide a set of numerical (binary) inputs to the body computer. Commonly the "accessory" position has the binary value "2." The OFF position has the value "0." The ON or RUN position has the value "3" and the start position has the value "1."

In one embodiment of the present system one position of state transition initiator 98 can be assigned an input value "zero" or "0" at what is termed switch position zero or "0." Switch position zero corresponds to an electrical power distribution state where all high voltage systems are de-initialized or in which they are in an irreversible process of de-initialization. State transition initiator 98 transitions to switch position zero occur through a temporary or filter state in order to build a delay into operator requests which would entail the de-initialization/discharge of high voltage systems and subsystems. Time filtering or delay is allows state transition initiator 98 transitions which pass through position zero, particularly from position 3 to position 2 or position 2 to position 3, without invoking de-initialization of high voltage systems. An example of such a transition would be repositioning of the state transition initiator 98 from the RUN position (position three) to the ACC(essory)/"Hoteling" position (position two). If there were no filtering/delay for this transition, de-initialization of high voltage systems and subsystems could begin, followed by a nearly immediate re-initialization of some of the same high voltage systems and subsystems. Such cycling of one or more isolated gated bi-polar transistors (IGBTs), or high voltage isolation contactors 67, 34 can result in increased levels of heat to be rejected from the pre-charge resistors 64, increased delay in reaching the selected vehicle functionality associated with the change in electrical power distribution system state and accelerated component degradation.

A "filter or temporary state" is a programmable time interval after which at least two events can occur. This allows for customization in the delay in response to possible requests for certain state transitions to allow for "confirmation" of the request through persistence of the state transition initiator 98 position. Initialization of the high voltage systems takes a perceptible interval of time, being a progressive, systematic event somewhat analogous to "booting up" a personal computer and includes mechanical manipulation of contactors, electrical capacitance charging, data storage and other events taken in anticipation of the next initialization cycle such as movement of the state transition initiator 98 from the RUN position (position three) to the START position (position one). Deinitialization of high voltage systems can also be time consuming events. Once started initialization or deinitialization may entail locking a state until completed.

State transition initiator 98 position one is where the rotary switch is momentarily rotated to its full "clockwise" position where it is (conventionally) opposed by a spring which urges the rotary switch back to the RUN position (position three). Unlike a conventional internal combustion engine equipped vehicle movement of the state transition initiator 98 to position one does not automatically result in the vehicle's thermal engine 48 starting although it does enable the control and electrical system's to start the thermal engine 48 should the battery state of charge level trigger such an event.

Upon stable re-location of the state transition initiator 98 to position one, a series of electrical system initialization events begin. Examples of initialization events may include: evaluation by the BMS controllers 70 of the traction batteries' state of charge; datalink communication between various hybrid controllers regarding their readiness and ability to receive high voltage electrical potential through a pre-charge system of isolation contactors 67 and associated pre-charge resistors 64. Evaluation of the transmission's or final drive's current gear status can occur as well and estimation of the vehicle's speed; the state of a parking brake switch (not shown) may all occur before cycling of the isolation contactors 67 (or equivalent IGBTs) from "closed/on" to "opened/off" occurs. Once the high voltage switching devices transition to the "closed/on" states they are not moved to an "opened/off" status without a de-initialization/shutdown procedure being executed. Here the high voltage system is "unloaded" in a similar but reverse fashion to the initialization process that occurred with transition of the state transition initiator 98 to position one. Again, however, filtering comes into play. Where the state transition initiator 98 is moved to position zero following a brief period at position one but prior to the isolation contactors 67 or IGBTs having closed, there is no point to electrically "unload" the electrical system and the high voltage system can shut down immediately.

Movement of the state transition initiator 98 in a "counter clockwise" rotational direction to its fullest deflection (position two) from position three or position one entails a transition through position zero. Position two, where the truck 12 is programmed to support "hoteling" can provide for operation of low voltage and selected high voltage systems and sub-systems in the support of electrified accessory such as: electrified HVAC condenser pusher fans and controller 52; secondary cooling loops 55; the HVAC compressor accessory motor 57; and DC-to-DC converters 62A-B. Battery state of charge is monitored which may result in starting of thermal engine 48 to operate electrical machine 47 in its generator mode. State transition initiator 98 position two can incorporate vehicle conditions entailing a stationary mode of operation suitable for accessory operation during operational modes such as "hoteling" or PTO application operation. Hoteling can involve operation of the vehicle's HVAC system for extended intervals while the vehicle is parked. Other vehicle conditions may include the park brake being set or the transmission being placed in a neutral state. In this mode state transition initiator 98 position would exclude the operation of other such electrified accessory systems and sub-systems such as the power steering accessory motor 59 and the pneumatic compressor accessory motor 32 as these devices are for use when the vehicle is mobile. Which electrified accessory systems are available and which are not is a matter of programming responsive to application of the vehicle. A vocational vehicle such as a wrecker could have a different list of available accessories and sub-systems if position two of the state transition initiator 98 was used to initiate its PTO mode of operation.

A vehicle providing a hoteling related electrical power distribution system state moves to a state consistent with enabling movement upon repositioning the state transition initiator 98 from state two to state three via state one. If however the vehicle is in the mobile vehicle mode of operation including key switch state three and the key switch is transitioned to key switch state position two ("hoteling" mode), the vehicle will remain in the mobile mode of operation as though the state transition initiator 98 had not been moved until such time that the vehicle's mode of operation (stationary mode) matches the state transition initiator 98 position. Once the vehicle's operational modes enables a request initiated from the state transition initiator 98, the vehicle electrical system would enter a state consistent with the "hoteling" or mobile modes of operation.

Figure 3:
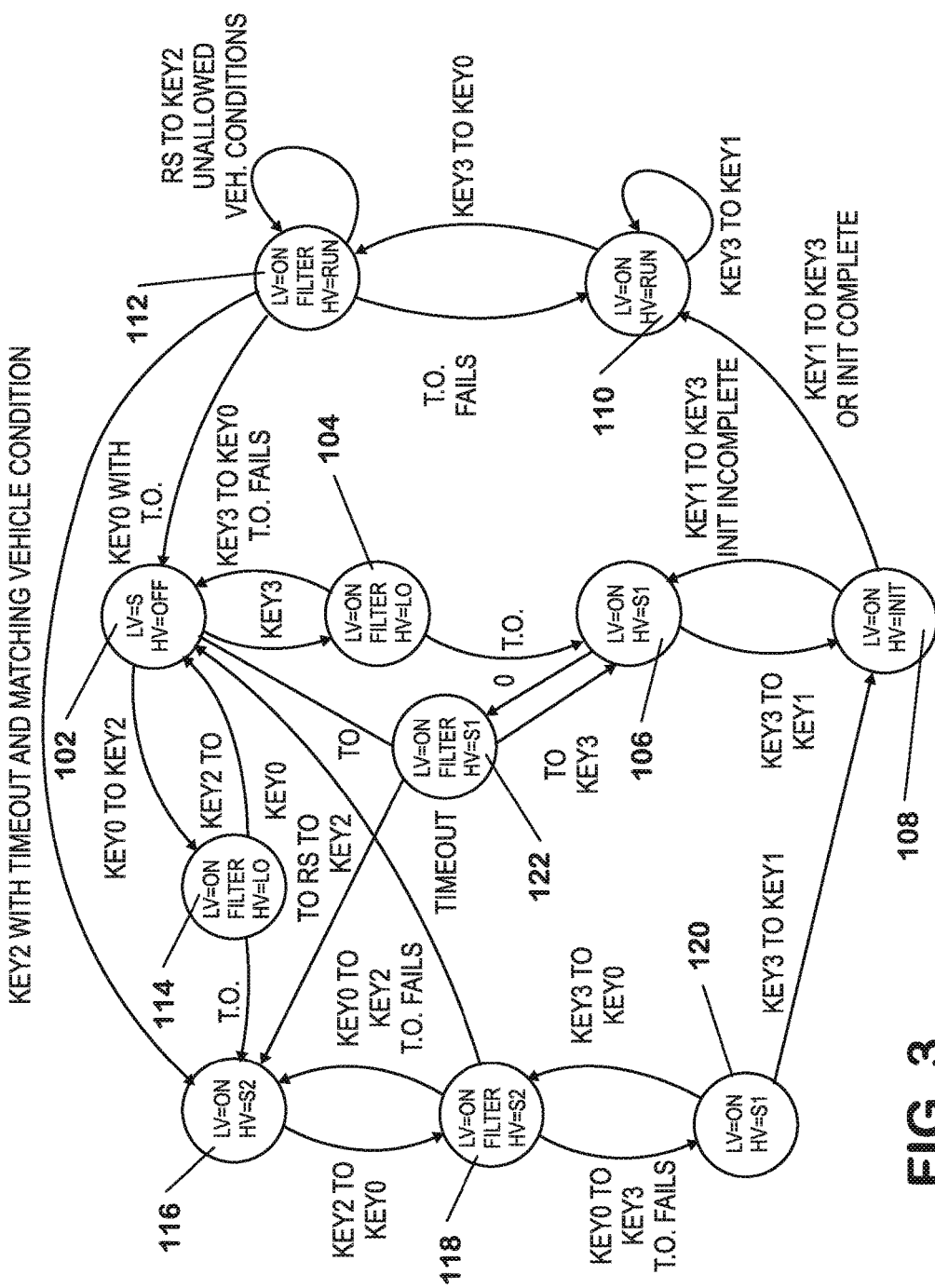
FIG. 3 is a high level state diagram illustrating operation of the system.

FIG. 3 is a simplified state machine illustrating a possible set of system responses to operator exercise of a state transition initiator 98 emulating a four position rotary ignition switch. The state diagram excludes consideration of system responses to emergency conditions and further excludes consideration of state changes occurring in response to traction battery state of charge. Non the less, more than one state of the vehicle electrical system is associated with switch positions two and three of a rotary switch/state transition initiator 98. It is assumed that electrical system power storage devices such as the high voltage traction batteries and the 12 volt chassis batteries are at a sufficient state of charge to support vehicle electric power distribution system operation in any of the available states. This does not mean that the batteries are fully charged however. A state diagram for a state transition initiator having a greater or fewer number of selection positions would be different. The state transition initiator could also be configured as a "shift" type device having a center "hold" position and temporary state up and state down transition requests.

States are described as being "stable," "temporary," or "persistent." Stable states are those states which are exited responsive to operator use of the state transition initiator 98. Absent such an occurrence the control and power distribution system remains in a stable state. Stable states may upon entry thereto be locked for a period of time. Release of the lock allows initiation of a state transition by the operator but does not itself initiate any further change of state. Temporary states are those which have a maximum time limit or time constraint based on a time filter. Persistent states are states which may include a time filter, and which therefore can operate like a temporary state, but which add consideration of exogenous conditions such as gear shift selection or vehicle speed before some state transitions are allowed. A persistent state may continue until a particular exogenous condition occurs even though a time delay has expired. Power distribution and control systems in temporary or persistent states will exhibit a transition to a different state regardless of what occurs with respect to the state transition initiator 98 although movement of the switch may change the destination state. The state machine of FIG. 3 contemplates normal operation absent intervention of protective interlocks such as provided for low voltage conditions on electrical power distribution sub-systems.

Referring to FIG. 3 a stable quiescent state 102 of the electrical power distribution system may be considered as a default state. This state occurs in response to the state transition initiator 98 being located at switch position zero for a minimum period of time. In its quiescent state the electrical power distribution system provides power to only selected low voltage systems. High voltage systems are either off or in the process of de-initialization. If de-initialization occurs during the quiescent state 102 that state is temporarily locked until de-initialization is complete.

Consideration may now be given to the electrical system response to movement by a user of the state transition initiator 98 from switch position zero to switch position two or to switch position three. Movement to switch position one is disregarded until a response to movement to position three is complete. A change from the switch position zero to position three produces a transition to the temporary state 104. Temporary state 104 may be a conflation of temporary states. In state 104 the low voltage systems receive power and a timer filter starts. Should the timer filter time out a state transition to a stable ready state 106 occurs where a set (S1) of high voltage components undergoes a pre-charge (PC) or initialization. Ready state 106 is stable and may be locked until the pre-charge sequence of high voltage components 51 completes. If, however, the state transition initiator 98 is returned to position zero (or passes through position 0) before the timer timed out at state 104 the system state returns to the stable quiescent state 102. This involves cutting power availability to some low voltage systems.

State 106 is stable. In state 106 much or all of the high voltage systems are charged or in the process of being pre-charged (in which case a lock is imposed) and the low voltage systems used for mobile operation of the vehicle are on. However, the vehicle is not put into a mobile state to preserve the analogy of function between a four position state transition initiator 98 and a rotary ignition switch.

From switch position 3 there are two state transition initiator 98 position changes directly available: clockwise to switch position one and counterclockwise back to switch position zero. Movement of state transition initiator 98 from position zero to position one initiates bringing the electrical system into a state for vehicle operation. Bringing the electrical system into a state suitable for vehicle operation may be as minimal as simply releasing an interlock on the vehicle transmission communicated to the TCU 42. On a non-hybrid, conventional vehicle it would involve cranking the vehicle's internal combustion engine concurrent with disabling other systems to increase available power. While state 108 occurs in response to movement of the state transition initiator 98 to what is the "start" or "crank" position on a conventional vehicle, state 108 does not initiate cranking of thermal engine 48 although it may allow it. Cranking on a hybrid vehicle occurs in response to a reduced or degraded battery state of charge occurring during one (or any) of the states where high voltage components are active. On a hybrid vehicle the "start" state 108 may be considered to a type of temporary state, but one which "times out" upon completion of an initialization cycle instead of a timing filter. On non-hybrid vehicles the start state can be considered "stable," lasting as long as the operator requests engine cranking Still, such a vehicle could be equipped with a timed limiter on cranking in which case the start state would revert to being "temporary" or to detect when the engine starts running and aborting cranking in response thereto.

Two transition paths out of state 108 are provided, a first returning to state 106 if the state transition initiator 98 moves back to key position 3 and initialization is incomplete and a second path advancing the system to a stable run state 110 if initialization has completed regardless of the state transition initiator 98 position. Transition from state 108 to state 110 occurs whether or not the state transition initiator 98 has been released from the "start" position. This path takes into account that while it is virtually certain that the key position of the state transition initiator 98 will return to key position 3 because the rotary switch is usually spring loaded for such a return upon release it is possible that the state transition initiator 98 would remain at position one due to unusual behavior on the part of the user or the state transition initiator 98 jamming. Any transitory movement of state transition initiator 98 from position three to position one while the electrical system is in state 110 (the vehicle being in an operational mode for vehicle movement) is without effect.

Movement of the state transition initiator 98 from position three to position zero when the electrical system is in state 106 results in initiation of a transition to a temporary timer filter state 122. The vehicle electrical state can remain at state 122 until the timer filter times out in which case the electrical state moves back along "TO" to state 102 and the high voltage system components which have been active (set S1) de-initialize. If the timer fails to time out due to return of the state transition initiator 98 to position three, or counterclockwise advancement of the switch to position two, the system electrical state returns to state 106, or assumes assumes state 116 depending upon the location of the rotary switch.

Transitions from the stable run state 110 to quiescent state 102 or to a stable hoteling/accessory state can occur as follows. In state 110 the low voltage systems are on and the high voltage systems are set for "run," in other words vehicle movement. The state transition initiator 98 is in position three and movements of the rotary switch to key positions 1 and 0 are possible. Movement of the state transition initiator 98 to key position one has no effect. Only movement of the state transition initiator 98 to position 0 initiates a state change, that being to persistent state 112. State 112 has a "temporary" character which stems from certain transitions out of the state occurring as a consequence of timing out of a timer filter. Its persistent character stems from the possibility that the state will continue after the timer filter times out and conditions other than (or in addition to) movement of the state transition initiator 98 are met. This arrangement provides for the possibility that the state transition initiator 98 may be moved from the position three to position one or position two without the vehicle being stopped, parked and the transmission placed in park. In addition, a time delay (filter) is also provided to reduce instances of cycling between on and off of the high voltage systems. Until the timer filter expires and vehicle conditions are met the vehicle electrical system remains in the same condition as it was in run state 110. Once the timer filter expires the vehicle can remain in a running condition unless certain conditions are met, for example the vehicle is stopped, the transmission is placed in neutral or park and, possibly, the park brake is set. If at any time the state transition initiator 98 is moved back to the position three while the vehicle is in state 112 the system immediately returns to state 110. It is possible to skip the timer filter if the state transition initiator 98 is moved through position zero to position two. In this case satisfaction of the vehicle conditions results in transition to hotel/accessory state 116 which is stable.

The occurrence of a time out of the timer filter and meeting the vehicle condition steps in state 112 can result in transition to state 102 or state 116 depending upon the position of the state transition initiator 98. State 102 is associated with key position zero and has been discussed. Switch position two is usually associated with a hoteling/accessory state of the vehicle electrical system which occurs in state 116 in which certain high voltage functions are allowed ("S2"). Switch position two may also be used for operation of PTO application 54. State 116 can also be reached from the vehicle electrical system quiescent state 102 along a path including temporary state 114. The path to state 116 from the quiescent state 102 is subject to timer filtering represented by temporary state 114. State 114 is analogous to state 104 except that the set (S2) of high voltage functions allowed power in state 116 may differ from the high voltage functions allowed power. State 114 occurs upon movement of the state transition initiator 98 from key position zero to key position two and expiration of a timer resulting in a high voltage pre-charge or initialization routine starting and being locked until completed. Return of the state transition initiator 98 to key position zero before the timer expires results in return to the stable quiescent state 102. Otherwise the electrical system state advances to stable state 116.

State transition initiator 98 can initially be moved from position two only to position zero. Accordingly, the only exit from stable state 116 is to a temporary state 118 provided to block casual cycling between states in which high voltage systems are operable and the quiescent state 102 (and back). At state 118 a timer is started. Until the timer expires the enabled portions of the electrical system remain unchanged. If the state transition initiator 98 is moved back to position two/2 before the timer expires the system state returns to stable state 116. If the timer expires the state transition is controlled by the current state transition initiator 98 position. With the state transition initiator 98 in position 0 the electrical system returns to the quiescent state 102. If the initiator 98 is in position three or one the state transitions to state 120, which electrically identical to state 106 except that different state transitions are occur following movement of the state transition initiator 98. Unlike state 106, if the state transition initiator 98 is moved from position three to position zero or through position zero to position two the system returns to state 118 instead of moving to state 122. In other words the system returns immediately to a state where the set of high voltage systems allowed to operate are those (S2) of the hoteling state. Should the operator moves the state transition initiator 98 to the start position (position one) to begin initialization of the vehicle for mobile operation the electrical system moves to state 108 which allows transition directly to states 106 and 110.

The system has been described employing a four position state transition initiator 98 used to initiate state control over a vehicle electrical power distribution and control system for a hybrid vehicle in which the rotary switch emulates a rotary ignition switch for a conventional vehicle. As indicated different types of state change initiation devices could be employed. Alternatively, the ordering of key positions could be changed. In addition the general system can be applied to vehicles other than hybrid vehicles, such as all electric vehicles. Different state machines can be employed with each and all of these vehicles.

Figure 4A:
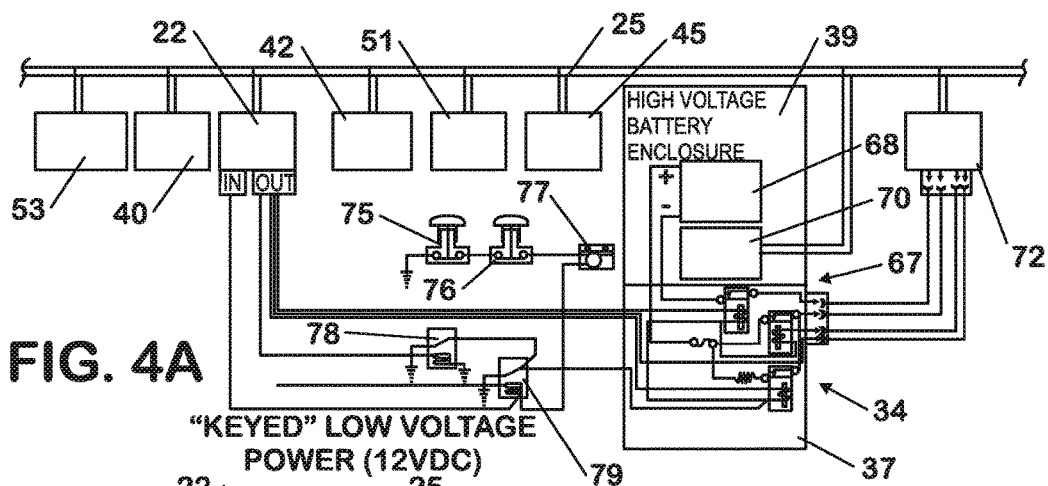
FIGS. 4A-C are mixed high level block diagrams of a portion of the control system and circuit schematic relating to a fail-safe sub-system for shutdown of a hybrid-electric vehicle high voltage power distribution system.
Figure 4B:
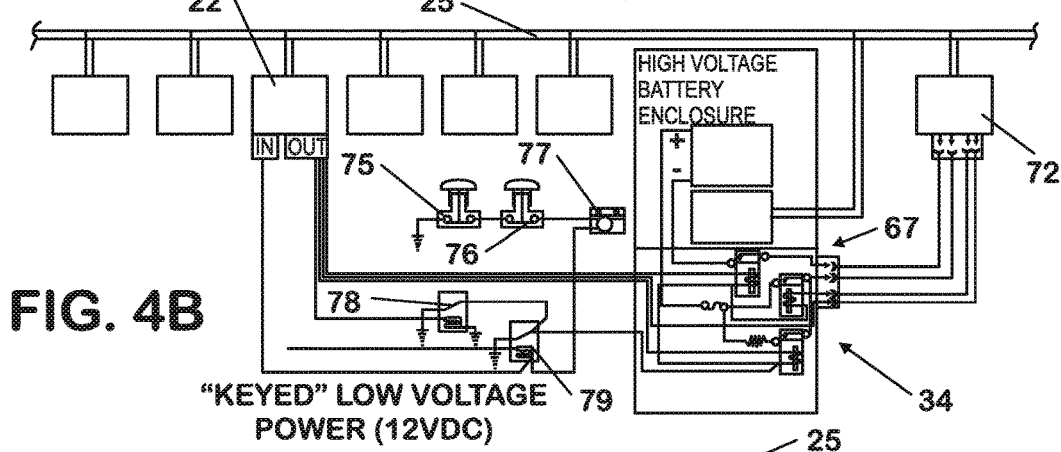
Figure 4C:
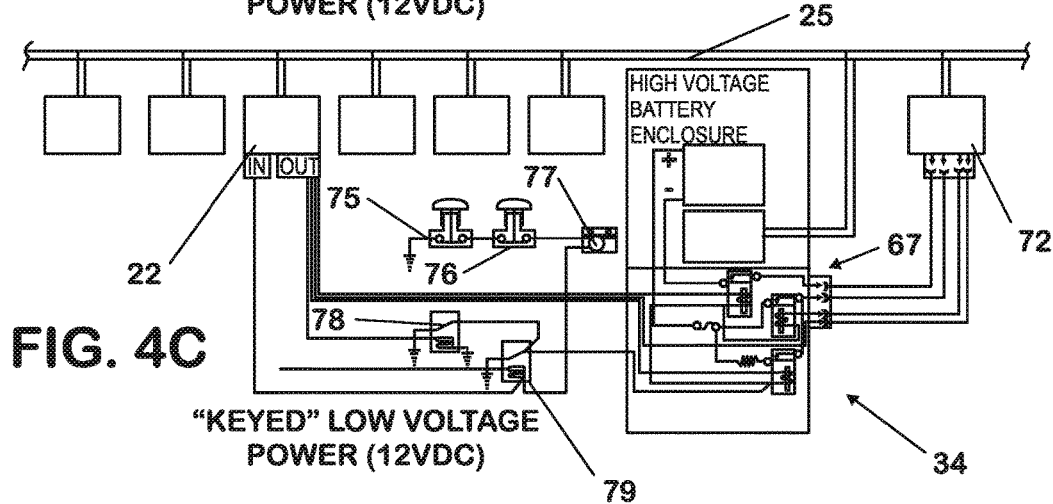

FIGS. 4A-C illustrate incorporation of mechanical switches into the control scheme illustrated in FIGS. 2A and 2B providing override of ESC 40/CAN implemented control over high voltage isolation contactors 67 for forcing shutdown and de-initialization of the high voltage power distribution system. The usual ESC 40 controlled implementation of shutdown occurs as long as the ESC 40 has and continues to maintain good data communication with a selected set of network nodes, for example the gauge and cluster controller 53, the TCU 42, the HCU 51, the ECU 45, RPM 22, BMS controllers 70 and, perhaps, high voltage load controllers 72, which may be RPMs over the public CAN data link 25. Under these circumstances ESC 40 can accurately control the operation of high voltage switching devices, particularly the isolation contactors 67 and 34 through RPM 22.

FIG. 4A illustrates the control system in an operational state such as state 106 or 110 of FIG. 3. In a CAN data link 25 controlled shutdown the ESC 40 operates through RPM 22 by data communications broadcast over CAN data link 25. RPM 22 has a plurality of outputs connected respectively to high side inputs for control solenoids operating with isolation contactors 67 and 34 and to the high side input for electro-mechanical relay 78. A plurality of series connected switches 75, 76 and 77 (including manual and automatic types) when closed provide a connnection to ground from the low side of the control solenoid for an electro-mechanical relay 79. They may be opened to provide emergency shutoff (or initiation of an emergency shutoff) of the high voltage electrical power distribution system. Power for the control solenoid of electro-mechanical relay 79 is provided from a "Keyed" low voltage power (12 VDC) source connected to the high side of the solenoid. The "Keyed" low voltage level is a 12 volt DC signal when high and and 0 volts or chassis ground when low and relates to the status or position of the state transition initiator 98. It should be low when the state transition initiator 98 is off.

When the vehicle is in an operational state relays 78 and 79 are held closed. With relays 78, 79 closed there is a connection from low side of control solenoids for isolation contactors 67, 34 in the high voltage distribution box 37 to vehicle chassis ground. The high side of these solenoids receive a drive signal from RPM 22. A state change initiated through movement of four position state transition initiator 98 opens isolation contactors by causing RPM 22 to cut the high side signals to control solenoids for isolation contactors 67, 34 followed by a loss of signal to the high side inputs for electro-mechanical relays 78 and 79. Isolation contactors 67, 34 open followed by relays 78, 79. This is a normal CAN controlled shutdown from the operation state illustrated in FIG. 4A.

In fault free operation ESC 40 responds to operation of one of switches 75, 76 or 77 to implement a controlled shut down of the high voltage power distribution system. This situation is illustrated in FIG. 4B. In FIG. 4B manual switch 76 has been opened resulting in loss of connection to chassis ground from a "keyed" low voltage (12 volt DC) source through closure of normally open relay 79. Opening any of switches 75, 76 or 77 would have the same effect. The opening of any of switches 75, 76 or 77 also results in a change in signal on an input (IN) to RPM 22 which goes from chassis ground to "keyed" low voltage of 12 volts DC. The change in input signal value is communicated to ESC 40 which initiates a controlled shutdown of the high voltage power distribution system including opening most or all of the isolation contactors 67 and 34 moving the system to something akin to state 102 but without possibility of exiting the state until there all of switches 75, 76 or 77 are again closed.

The opening of relay 79 (shown in FIG. 4B) does not effect the state of electro-mechanical relay 78. As a consequence the ground connections from solenoids controlling isolation contactors 67, 34 remain in place. In other words, even though one of switches 75, 76 or 77 was moved, the resulting opening of isolation contactors 67, 34 still occurs under the control of ESC 40 through RPM 22 and can be programmed to occur after partial or full reduction in the high voltage loads.

Switches 75, 76 and 77 can be manual or automatic. An example of an automatic shut-down switch 77 could be a roll over switch. Automatic here does not imply control is exercised over the switch as part of the control system built around CAN data link 25, but that the switch operates independently and without operator intervention, typically in response to a vehicle event.

While opening switches 75, 76 and 77 can result in a software/ESC 40 controlled shutdown, it can also produce a forced shutdown in the situation if relay 78 is open when the switch operation occurs. Relay 78 remains closed as long as it receives a high signal on its high input from RPM 22. RPM 22 functions to provide that signal only so long as RPM 22 itself remains functional. RPM 22 can also be programmed or directed by ESC 40 to discontinue the signal under a number of other circumstances, such as loss of an acceptable communication link over CAN data link 25 with a selected set of controllers potentially including, but not limited to, gauge and display cluster controller 53, ESC 40, TCU 42, HCU 51, ECU 45 and BMS controller 70. Loss of the high side signal to relay 78 does not in itself result in a forced shut down, but in effect releases switches 75, 76 and 77 to operate in a fully autonomous fashion as their operation under this condition results in loss of connection to chassis ground from the low side of the isolation contactors 67, 34. See FIG. 4C. This is a "fail-safe" operational mode and exposes the isolation contactors 67 and 34 to possible damage as now ESC 40 intervention is provided to shed loads, however occasions of its use should be reduced by the usual availability of a shutdown response envisioned in FIG. 4B.

In summary, various system responses which lead to shut down of vehicle high voltage sub-systems are provided. Shut down occurs as a result of overt manual requests or indications of a vehicle accident. If possible, an intelligent response which first reduces high voltage system power draw before opening isolation contactors is used, but if not possible the system reverts to the possibility of a hardwired, uncontrolled shutdown. The ESC 40 can put the system in a state where an uncontrolled shutdown is enabled without triggering such an occurrence. Unavailabilty of the ESC 40 may by default produce this state.

Figure 5:
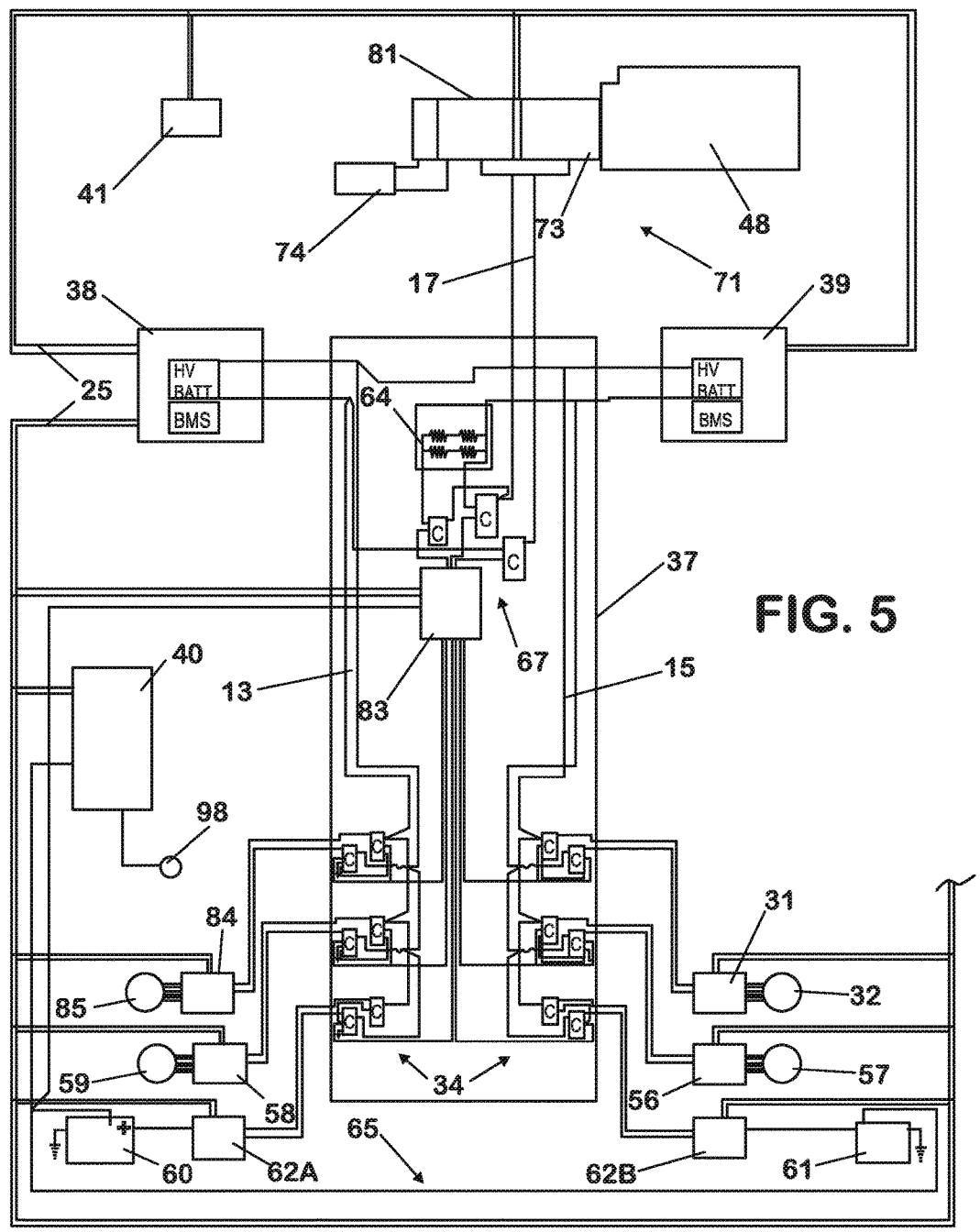
FIG. 5 is a simplified high level block diagram of a control and power distribution system.

FIGS. 2A, 2B and 5 illustrate hybrid-electric control and power distribution systems incorporating power distribution sub-systems operating at different DC voltages. The application in FIG. 5 is a series hybrid-electric drive train 71 with a power take-off (PTO) application 74 connected to the traction motor 81. In particular there are two 350 volt DC accessory buses 13, 15, a 700 volt direct current feed 17 and a 12 volt low voltage sub-system 65. Electrical machine 47 operates on three phase alternating current as can electrical generator 73 and hybrid fraction motor 81. Each of these systems has loads, for example, the 350 volt DC accessory buses 13, 15 can support various high voltage accessory motors 32, 57, 59 and 85 as shown in FIG. 5. These motors are, respectively under the direct control of motor controllers 31, 56, 58 and 84 and indirect control of a high voltage distribution box control module 83. The low voltage sub-system 65 would typically support vehicle cab lighting (not shown) and similar legacy twelve volt loads. The low voltage sub-system 65 is electrically coupled to the 350 volt DC accessory buses 13, 15 through bi-directional DC to DC converters 62A and 62B. The low voltage sub-system 65 also provides power to nodes of the CAN data links 23, 25 such as RPM 22 (FIG. 2, 2B, not illustrated) and the high voltage distribution box control module 83 of FIG. 5 and from those devices to high side inputs of control solenoids associated with relays and isolation contactors 67, 34.

Electrical energy communication paths can arise between sub-systems as a result of operation of isolation contactors 34, 67 particularly during initialization of high voltage systems as occurs during transitions to states 106 or 116. A low voltage power source such as low voltage sub-system 65 supplies the power to operate these high voltage switching devices. It is possible that inrushes of energy into high voltage devices will draw down voltage on the low voltage sub-system 65 either through simple operational demands of supplying power to the solenoids or through the bi-directional converters 62A-B. This can in turn result in a partial loss of control over isolation contactors 34, 67 resulting in chattering, bouncing or field weakening of the high voltage devices impeding their ability to support stable voltage and current control throughout the initialization cycle. These effects can also reduce the expected service life of components as a consequence of damage to the components. The initialization process does not typically occur across all system components concurrently. It can occur in phases over time depending upon which sub-systems are active in a given state/vehicle mode of operation.

The low voltage sub-system 65 is illustrated in FIG. 5 as connected to ESC 40. This allows voltage on the ESC 40 to be monitored by the ESC 40. Under circumstances where voltage on the low voltage sub-system 65 is insufficient or too low to properly support operation of high voltage switching devices such as isolation contactors 34, 67 then their operation is blocked. If the voltage level on the low voltage sub-system 65 is initially adequate but falls below minimums during the initialization/state transition process the process can be aborted by cut off of power from the low voltage sub-system 65. ESC 40 is programmed to provide a low voltage control circuit interlock module that tracks which high voltage sub-systems are active and inactive potentially including truck equipment manufacturer (TEM) installed PTO applications 74. Feedback to an operator is provided over driver display 41 as to the state of high voltage switching devices and the status of the low voltage sub-system 65.

Specifically, ESC 40 monitors low voltage sub-system 65 voltage levels and in response to a voltage level below a minimum threshold and directs the high voltage distribution box control module 83 to prevent activation/closure of isolation contactors 67, 34. The minimum threshold is adjustable and it is possible that different thresholds may exist for different accessory isolation contactors 34. Where the low voltage sub-system 65 voltage is initially adequate but falls below its minimum threshold level during a state transition involving initialization of high voltage sub-systems the low voltage control potential sourced to the isolation contactors 34, 67 is turned off aborting the transition.

Once ESC 40 has activated a low voltage control circuit interlock in response to a low voltage condition the interlock cannot be reset and the isolation contactors 67, 34 reinitialized until the rotary switch emulator/state transition initiator 98 has been reset to key position "zero." That is, the vehicle electrical system must transition to state 102 in FIG. 3 before the interlock is released. ESC 40 continues to monitor low voltage sub-system 65 voltage levels such that subsequent sub-system initializations may be protected even though prior state transitions may have been blocked or aborted. In other words, the interlock can be made selective and some state transitions may occur with the interlock in place. For example, a transition from the stable run state 110 where the vehicle is being operated in manner consistent with relocating the vehicle or its cargo to an alternative location can be permitted. A transition out of hotel mode (state 116) involving activation of sub-systems for the stable run state 110 or cranking allowed state 108 would not be permitted.

What is claimed is:

1. An electrical power distribution and control system for a motor vehicle, the electrical power distribution and control system comprising:
a plurality of electrical power distribution buses;
an operator actuable state transition initiator;
means for establishing the electrical power distribution and control system in one of a plurality of stable states;
means responsive to operation of operator actuable state transition initiator for placing the electrical power distribution and control system into one of a plurality of temporary states on transition of the electrical power distribution and control system between stable states where the temporary state is characterized by a time duration;
means responsive to operation of the operator actuable state transition initiator for establishing at least a first persistent state of the electrical power distribution and control system, release of the persistent state being contingent upon exogenous operating conditions of a host motor vehicle absent further operation of the operator actuable state transition initiator, wherein the operator actuable state transition initiator is a four position rotary switch and emulates an ignition switch;
a high voltage electrical power source;
the plurality of electrical power distribution buses including a high voltage power distribution bus and a low voltage power distribution bus;
a pre-charge system and high voltage switching elements for connection of the high voltage electrical power source to the high voltage power distribution bus;
a stable quiescent state where the high voltage power distribution bus is low;
a stable ready state where the high voltage power distribution bus is charged or is being pre-charged; and
a temporary state where the low voltage power distribution bus is active and which has transition paths to and from the stable quiescent state and at least to the stable ready state.

2. An electrical power distribution and control system as claimed in claim 1, further comprising:
a plurality of loads;
a plurality of vehicle controllers;
control elements for selectively connecting the plurality of loads to the high voltage power distribution bus;
a stable run state where a first set of the plurality of loads and vehicle controllers is operable; and
a stable accessory state where a second set of the plurality of loads and vehicle controllers is operable.

3. An electrical power distribution and control system as claimed in claim 2, further comprising:
the stable accessory state provides for operation of a power take-off application.

4. An electrical power distribution and control system as claimed in claim 2, further comprising:
the stable accessory state provides for hoteling functionality on a host vehicle.

5. A control method for a hybrid vehicle including an engine, an electrical machine, an electrical power storage system, a converter/inverter electrically connected to the electrical machine, a plurality of electrical loads, a power distribution system operable for delivering electrical power to the electrical loads and to the converter/inverter at diverse voltages, a plurality of controllers generating values for vehicle operating variables and a state change initiator operable by a driver, the control method comprising the steps of:
providing a default, stable, quiescent state in response to positioning or cycling of the state change initiator to an off position wherein a minimum set of electrical loads is powered;

transitioning to a stable on state in response to selected repositioning of the state change initiator in which a second set of electrical loads is powered but the hybrid vehicle is immobilized;

transitioning to a stable run state in response to repeatedly moving the state change initiator across a start position in which the hybrid vehicle is mobile;

transitioning to a stable accessory state in response to selected positioning of the state change initiator in which a third set of electrical loads is powered for hoteling or power take off applications.

6. A control method as claimed in claim 5, comprising the further step of:

providing a persistent state between transitions from the run state to either the accessory state or the quiescent state where exit from the persistent state is dependent upon values of vehicle operating variables.

7. A control method as claimed in claim 5, comprising further steps of:

interposing temporary states into transitions into stable states where the transition activates or deactivates high voltage electrical loads.

\* \* \* \* \*